United States Patent [19]

Hirose et al.

[11] 4,109,279
[45] Aug. 22, 1978

[54] TELEVISION CAMERA OPTICS WITH A LIGHT GUIDE FOR CAMERA ADJUSTMENT

[75] Inventors: Ryusho Hirose, Machida; Kotaro Wakui, Tokyo, both of Japan

[73] Assignees: Canon Kabushiki Kaisha; Nippon Hoso Kyokai, both of Tokyo, Japan

[21] Appl. No.: 850,207

[22] Filed: Nov. 10, 1977

Related U.S. Application Data

[63] Continuation of Ser. No. 689,912, May 25, 1976, abandoned.

[30] Foreign Application Priority Data

May 28, 1975 [JP] Japan ................... 50/63891

[51] Int. Cl.² .............. H04N 9/09; G02B 27/14
[52] U.S. Cl. ..................... 358/55; 350/173
[58] Field of Search ............ 350/173; 358/55

[56] References Cited

U.S. PATENT DOCUMENTS

| | | | |
|---|---|---|---|
| 3,590,145 | 6/1971 | Schneider et al. | 350/173 |
| 3,610,818 | 10/1971 | Bachmann | 350/173 |
| 3,718,752 | 2/1973 | Katsuta et al. | 350/173 |
| 3,824,004 | 7/1974 | Doi et al. | 350/173 |
| 3,945,034 | 3/1976 | Suzuki | 350/173 |
| 3,976,363 | 8/1976 | Toyama et al. | 350/173 |

*Primary Examiner*—Jon W. Henry
*Attorney, Agent, or Firm*—Toren, McGeady and Stanger

[57] ABSTRACT

A television camera employing a dichroic mirror light-splitting system and a supplementary light arrangement for introducing an external light beam into the dichroic mirror when the camera is initially to be adjusted with respect to pattern registration, color balance and color temperature compensation. As the dichroic mirror is selectively receptive of the light beams from the television camera lens and the light arrangement, when the external light beam is allowed to enter the dichroic mirror, the resulting outputs of three color component image pick-up tubes are electrically processed according to a predetermined program to effect automatic adjustment of the TV-camera.

9 Claims, 2 Drawing Figures

TELEVISION CAMERA OPTICS WITH A LIGHT GUIDE FOR CAMERA ADJUSTMENT

This is a continuation of application Ser. No. 689,912, filed May 25, 1976, now abandoned.

BACKGROUND OF THE INVENTION

This invention relates to color television cameras having incorporated therein a color separation system, and more particularly to an optical system for a color television camera, a part of which is operatively combined with an additional light arrangement usuable for automatic adjustment of the camera with respect to, for example, color temperature compensation.

The purpose of initial adjustment of a color television camera of the multi-tube type is, as of importance, to superimpose primary colored patterns in registration with each other, namely, the so-called "registration adjustment", and reproduce correct colors, namely, the so-called "color balance adjustment", and, in application to outdoor photography, to compensate a change in color temperature which may be encountered during operations of the camera where different lighting situations are successively given. Each time the color temperature of the lighting situation is changed, it has been the prior art practice either or both to introduce white light from a temporarily employed white object of reference into the television camera lens with the resulting output signals of the individual pick-up tubes being modulated by gain adjustment to predetermined ratios, in color balance, and/or to insert a filter into the optical path of the photographic objective lens, with the resulting outputs of the tubes being modulated in white balance to compensate the change in color temperature. This necessity of always carrying about the reference object along with the television camera and further of bringing the reference object into and holding in photographing relation to the television camera lens to effect the introduction of white light thereto each time the camera adjustment is made is very inconvenient.

SUMMARY OF THE INVENTION

To eliminate such inconvenience, the present invention contemplates the use of a supplementary light arrangement incorporated in an optical system for a television camera and selectively cooperative with a part of the optical system for automatically adjusting the camera to compensate a change in color temperature without the necessity of any white reference object which would be otherwise encountered each time when the color temperature of the object space is changed.

According to the main embodiment of the present invention as applied to a color television camera employing a dichroic mirror light-splitting system with a first dichroic mirror being positioned between the front and rear lens groups of a television camera lens to split an incoming light beam into reflected and transmitted portions, and with a second dichroic mirror being positioned behind the rear lens group in the path of the transmitted light portion from the first dichromic mirror to split it into two component color beams which are directed to respective pick-up tubes while the reflected portion from the first dichroic mirror being directed through a lens group equivalent to the rear lens group to another pick-up tube, there is provided a light guide through which an external light beam is introduced onto the first dichroic mirror in coaxial alignment with the reflected portion of the incoming light beam by the first dichroic mirror. The term "external light" herein used is intended to refer to light from a light source or sources with which the object space of the camera is illuminated. With this light arrangement, it is possible to design a program according to which automatic adjustment of the camera with respect to color temperature compensation is achieved. An example of the program may be determined in such a manner that at first a reference object under a standard lighting situation of certain color temperature is photographed with the camera, while being shielded from the external light with the resulting outputs of the pick-up tubes being memorized, then the external light is introduced into the camera while being shielded from the light entering through the camera objective lens with the resulting outputs of the pick-up tubes being memorized, then the first-named and second-named outputs are correlated with each other so that when a scene under a given lighting situation is photographed, the outputs of the individual pick-up tubes are modulated to respective degrees dependent upon the deviation of the color temperature of the given lighting situation from that of the standard one.

DESCRIPTION OF THE PREFERRED EMBODIMENT

Figure 1:
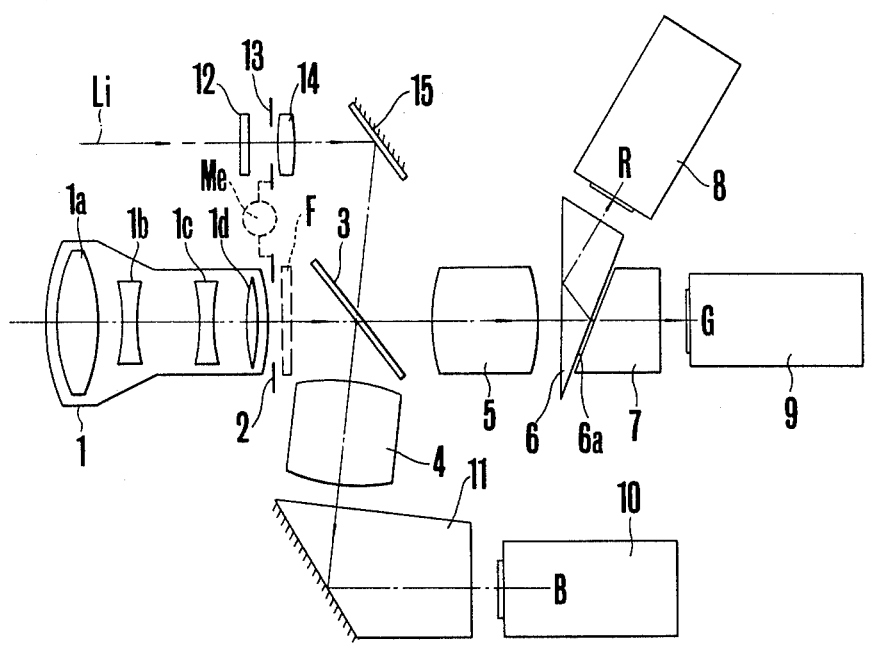
FIG. 1 is a side sectional view, partly schematic, of a color television camera employing a dichroic mirror light splitting system and a supplementary light arrangement selectively cooperative with the system according to the invention.

Referring to FIG. 1, there is shown one embodiment of the present invention as applied to a color television camera with a front lens group 1 constituting a photographic objective lens of zoom type together with one of two rear lens groups 4 and 5. The front lens group 1 comprises a focusing lens member 1a, a variator lens 1b, a compensator lens 1c and an erector lens 1d arranged in this order from the front, and is afocal. Located just in rear of the front lens group 1 is a diaphragm 2 which, aside from its normal use in exposure control through the objective lens, functions as a light-shielding means operable from the outside of the camera. Each of the rear lens groups 4 and 5 is infinitely focused to receive collimated light rays from the front lens group 1 through a first dichroic mirror 3 constituting part of a light-splitting system of color separation design. The first dichroic mirror 3 is disposed at a 45° angle with respect to the optical axis of the objective lens, and it reflects the blue component of the light and transmits the red and green components. The light-splitting system further includes a second dichroic mirror or red reflector dichroic mirror constituted by a dichroic film 6a between two prisms 6 and 7, and positioned in rear of the rear lens group 5 so that the green component passes through the both prisms 6 and 7 to the exit face of prism 7, while the red component passes through only one prism 6 to the dichroic film 6a, then is reflected therefrom into the prism 6, and then passes therethrough to the exit face thereof after total reflection from the entrance face thereof. The red and green components exiting from the prisms 6 and 7 are directed onto the image-receiving surfaces of pick-up tubes 8 and 9 respectively, while the blue component reflected by the first dichroic mirror 3 is directed through the rear lens group 4 and a total reflection prism 11 onto the image-receiving surface of another pick-up tube 10. In this arrangement of the basic parts of an ordinary color television camera optics, rays of light from a scene being photographed are collimated by the front lens group 1, and a single collimated light beam is directed along the principal axis of the optics with the result that, if the single collimated light beam is achromatic, it is split by the first dichroic mirror 3 into the yellow and blue collimated beams containing image information and which are directed in the output directions along the principal axis of the optics and a perpendicular second axis respectively.

Figure 2:
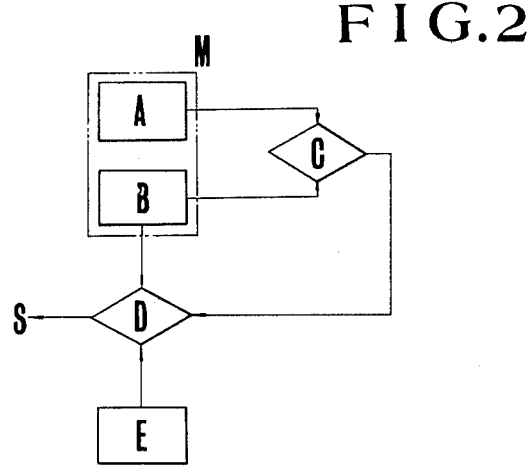
FIG. 2 is a block diagram of a flow chart illustrating a manner in which the camera of FIG. 1 may operate to be adjusted with respect to color temperature compensation.

The camera optics is provided with a supplementary light arrangement or light guide for introducing external light of rays Li into the light-splitting system. This light guide is shown as comprising a transparent chart or filter 12 for color temperature adjustment by a desired factor detachably mounted at a window and serving as a window pane, a light-shielding means or shutter 13, a lens 14 and a full mirror 15, these parts being arranged so that the external light Li entering through the window 12, opened shutter 13 and lens 14 is reflected by the mirror 15 to the first dichroic mirror 3 in coaxial alignment with the second axis of the camera optics, or the axis of the portion of the blue component beam which is between the dichroic mirror 3 and the prism 11. In order for the first dichroic mirror 3 to be selectively receptive of the light beams from the front lens group 1 and the light guide, there is provided a control mechanism operatively associated with the first and second light-shielding means, namely, the diaphragm 3 and the shutter 13. p An example of the manner in which the apparatus of FIG. 1 may operate is explained below with reference of FIG. 2. At first, the control mechanism Me is actuated to close the shutter 13 but to open the diaphragm 2. When a reference object is illuminated by a light source of reference color temperature, the camera shooting the object produces certain outputs appearing at the individual pick-up tubes 8, 9 and 10. These output characteristics are memorized in a device M such as a computer, representing information A. Next, the control mechanism Me is actuated again to open the shutter and to close the diaphragm 2, thereby the external light Li is introduced through the chart 12 into the light-splitting system, with the resulting outputs of the pick-up tubes 8, 9 and 10 differing from those obtained above. These output characteristics are memorized in the device M, representing information B. These informations A and B constitute the reference informations.

When the given lighting situation has a color temperature different from the reference one, the camera with the open shutter 13 operates with the resulting outputs of the pick-up tubes 8, 9 and 10 differing from those obtained above. These output characteristics serve as information E.

Of these informations, informations A and B are compared by a comparator C to produce a signal correlating information B to information A, and which is then applied to a computer D. Next, the informations B and E are compared by the computer D to produce a signal dependent upon the degree of deviation of the given color temperature from the reference one and which is combined with the former signal to produce a signal S. This signal may be either applied to a modulator for the outputs of the pick-up tubes 8, 9 and 10, or used to select a correspondingly specified conversion filter of color temperature for insertion into a space between the front lens group 1 and the light-splitting system, for example, at a location indicated by F in FIG. 1.

In application to automatic registration and color balance adjustment, the apparatus of FIG. 1 may be combined with a slide having a black-and-white pattern of certain configuration instead of the chart 12. In this case, it is preferred to use a lamp as positioned in front of the slide 12.

There are a number of advantages to the present invention as the provision for various automatic camera adjustments is made within the housing of a television camera optics. For example, there is no need to prepare a reference object each time the color temperature of the lighting situation under which the camera is used is changed, thereby much time can be saved.

What is claimed is:

1. A television camera optical system for viewing a scene and having a light guide for camera adjustment comprising:
   (a) a television lens group including a front lens group,
   (b) a plurality of photo-detecting means,
   (c) a color separation means positioned substantially between said front lens group and said photo-detecting means,
   (d) a primary shading means positioned on the object side of said color separation means and receiving light from the scene through said front lens group.
   (e) a light guiding path outside said television lens group for transmitting light from the scene and in which a transparent means and an adjustable secondary shading means are positioned, and
   (f) a beam splitting means positioned on the image side of said primary shading means at a location substantially coincident with a point of intersection of the optical axis of said light guiding path and said television lens group.

2. A television camera optical system as described in claim 1, wherein said television lens group has a plurality of rear lens groups positioned on the image side of said front lens group, and said color separation means has at least two dichroic mirror surfaces, the front dichroic mirror surface of said two dichroic mirror surfaces being said beam splitting means.

3. A television camera optical system as described in claim 2, wherein one of said rear lens groups is arranged to receive light reflected from said front dichroic mirror surface, and another one of said rear lens groups is arranged to receive light transmitted through said front dichroic mirror surface.

4. A television camera optical system as described in claim 3, wherein said transparent means is a filter.

5. A television camera optical system as described in claim 3, wherein said transparent means is a test chart.

6. A television camera optical system as described in claim 3, further including a conversion filter of color temperature detachably mounted behind said front lens group.

7. A television camera optical system as claimed in claim 1, further including means responsive to light entering said light guiding path to adjust the outputs of the photodetectors.

8. A television camera optical system as claimed in claim 7, in which said means includes a filter interposed between said lens group and said color separation means.

9. A television camera optical system as claimed in claim 1, wherein the control means closing the primary shading means alternatively closes the adjustable secondary shading means.

* * * * *